United States Patent [19]
Adair

[11] 4,059,898
[45] Nov. 29, 1977

[54] METHOD OF MAKING A SMALL ELECTRIC MOTOR

[76] Inventor: Gerald L. Adair, 419 Dane St., Woodstock, Ill. 60098

[21] Appl. No.: 724,589

[22] Filed: Sept. 20, 1976

Related U.S. Application Data

[62] Division of Ser. No. 588,011, June 18, 1975, Pat. No. 4,035,676.

[51] Int. Cl.² ............................................. H02K 15/02
[52] U.S. Cl. ........................................ 29/598; 29/525; 310/42; 310/43
[58] Field of Search ................. 29/598, 597, 596, 525; 310/42, 43, 156

[56] References Cited
U.S. PATENT DOCUMENTS

| | | | |
|---|---|---|---|
| 2,708,246 | 5/1955 | Dunn | 29/597 X |
| 2,716,269 | 8/1955 | Frisbie et al. | 29/597 |
| 2,818,517 | 12/1957 | Loosjes | 29/598 X |
| 3,084,420 | 4/1963 | Burr et al. | 29/598 |

Primary Examiner—C.W. Lanham
Attorney, Agent, or Firm—Kinzer, Plyer, Dorn & McEachran

[57] ABSTRACT

Concentricity between the rotor and rotor shaft of a small motor is attained by means of a plastic, toothed hub on the shaft press fitted into the rotor; any eccentricity is removed by shearing the teeth.

1 Claim, 10 Drawing Figures

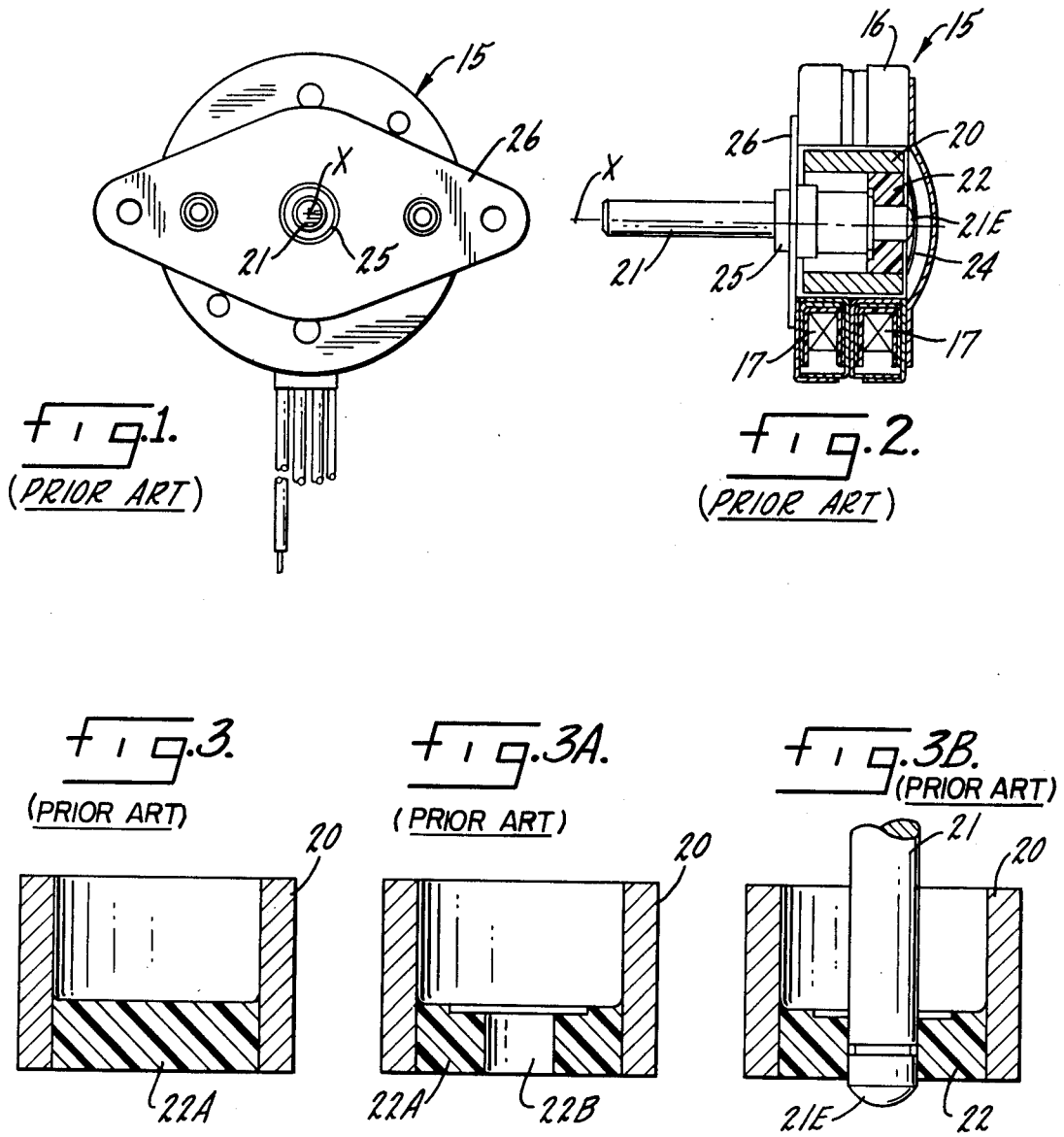

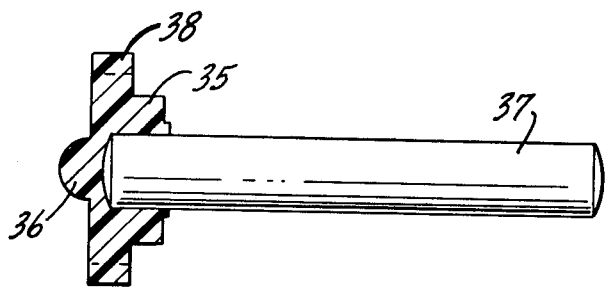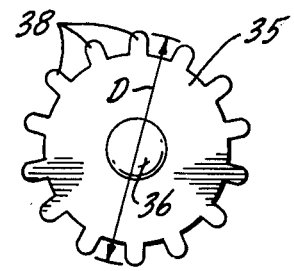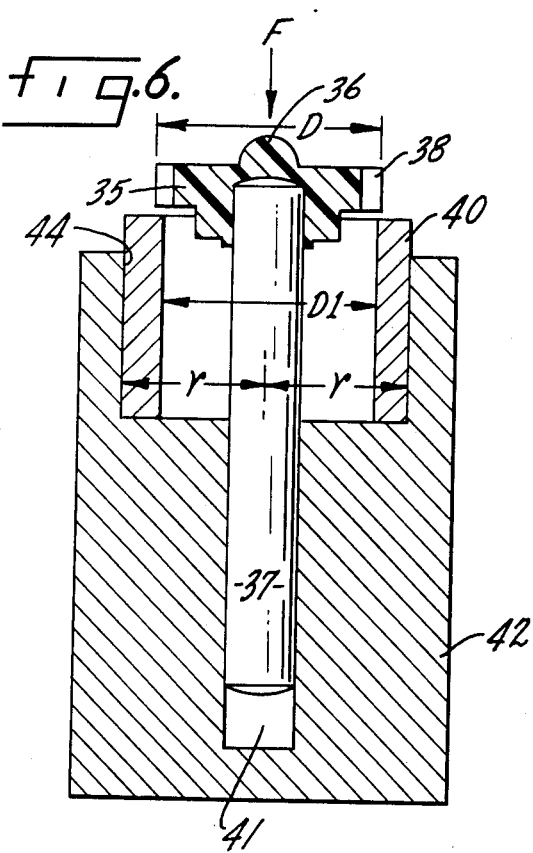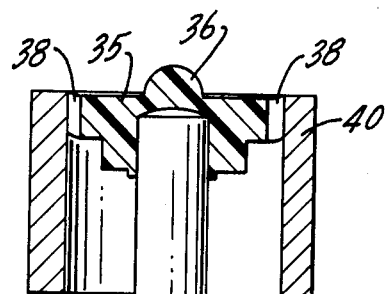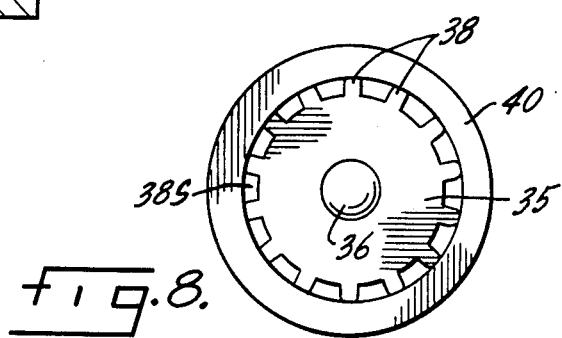

METHOD OF MAKING A SMALL ELECTRIC MOTOR

This is a division as of application Ser. No. 588,011, filed June 18, 1975, now Pat. No. 4,035,676.

This invention relates to subfractional dynamoelectric machines, and particularly subfractional electric motors.

Some subfractional electric motors embody a permanent magnet rotor of cylindrical form mounted on a shaft. The present invention relates to such motors. Small synchronous motors are an example. The magnet rotor may be composed of magnetizable barium ferrite, and is magnetized to afford a plurality of magnetic poles angularly displaced around its periphery.

The rotor and shaft are connected by a hub. The mass represented by the hub adds inertia which inherently retards attainment of running speed. One object of the present invention is to afford a hub of less mass, thereby reducing the inertia. Also, the shaft is usually extended beyond the hub to provide a thrust element to dampen undesired shaft movement. The lengthened shaft imparts more inertia. A related object of the invention is to construct the hub to incorporate an integral thrust element of light weight.

A problem also exists in connection with manufacture, namely, to maintain concentricity between the shaft and the periphery of the rotor magnet. The critical dimension in terms of concentricity is to have the outer diameter (O.D.) of the supporting shaft concentric to the O.D. of the magnetic rotor. If this can be attained, a slight amount of eccentricity between the shaft and the inner diameter of the rotor can be tolerated. However, lack of concentricity in the critical dimension, the O.D. of the magnet, results in wobble. This, in turn, results in lateral thrust on the shaft bearing, wearing the bearing and contributing to noisy operation. The larger the mass of the hub connecting the rotor and shaft, the more these disadvantages are exacerbated.

Assured concentricity can be attained by accurately grinding both the I.D. and O.D. of the rotor magnet. This approach may be used with a pre-formed continuous-rim hub either press fit or cemented to the shaft and to the rotor, as in U.S. Pat. No. 3,633,055. This is expensive. The more common approach is to form the hub in situ inside one end of the magnet. This is usually accomplished by pouring or injecting a resin in a fluid state to fill one end of the magnet. When the resin has hardened, the hub is machined at its center in some fashion to present an opening for the shaft, centered by means of a fixture. The manner of machining the hub may vary.

This approach to attaining concentricity embodies several time consuming steps. Therefore, another object of the invention is to reduce the assembly steps for attaining concentricity and to afford more dimension tolerance in the parts being assembled without sacrificing precision in the completed rator assembly.

In the drawings:

FIG. 1 is an elevation of a subfractional synchronous electric motor in which the present invention may be embodied;

FIG. 2 is a sectional view of a synchronous motor such as shown in FIG. 1, but showing a known construction;

FIGS. 3, 3A and 3B are sectional views showing a known method of assembling a permanent magnetic rotor assembly for the motor shown in FIG. 2;

FIG. 4 is a sectional view showing a sub-assembly of parts for a rotor assembly under the present invention;

FIG. 5 is an end view of the sub-assembly taken along line 5—5 in FIG. 4;

FIGS. 6 and 7 are sectional views showing the method of assembly under the present invention; and FIG. 8 is an end view of the complete rotor assembly, taken along line 8—8 in FIG. 7.

The subject matter of the present invention may be incorporated in the construction of a synchronous motor 15, FIG. 1, typical of a subfractional motor having a cylindrical shaft-supported rotor.

The subject matter of the present invention is best understood by referring to typical prior art. For this purpose FIG. 2 is presented to show a known construction inside a motor of the type shown in FIG. 1. The housing 16 of the motor retains two windings or field coils 17 surrounding a rotor 20. The rotor may be a permanent magnet of the barium ferrite type. The rotor 20 is mounted on a shaft 21 constituting the mechanical out-put of the motor in the known construction, by a hub 22. The hub 22 has an opening in the center through which the shaft is inserted, and cemented in place. The periphery of the hub is continuous and is bonded to the rotor as hereinafter explained.

One end 21E of the shaft extends beyond the hub 22, to serve as the thrust end of the shaft, being opposed by a leaf spring 24 to dampen movement of the rotor assembly when the motor is energized.

The shaft 21 is rotatably supported by a single bearing 25 retained by a bracket 26 secured to the housing 16.

Concentricity between the outer diameter (O.D.) of the rotor 20 and the axis X of shaft 21, with some minimum tolerance, is important; otherwise, the rotor assembly will wobble, resulting in noise, inefficient operation and shortened bearing life.

One common method of attaining concentricity is shown in FIGS. 3, 3A and 3B. A flowable plastic or resin 22A, such as an expoxy resin, is poured or injected into the rotor, FIG. 3. It bonds naturally at the periphery to the rotor after the resin material is hardened the collar or hub 22A thus afforded is machined in the center, FIG. 3A, to afford an opening 22B for the shaft 21. The shaft 21 is then inserted into the opening 22B and is fixed thereto as by a suitable cement. A fixture, not shown, is employed to assure concentricity within a minimum tolerance during seating of shaft 21.

Variations are employed insofar as concerns providing an opening in the hub for seating the shaft. For example, it has been proposed to press an aluminum washer into the cast resin (epoxy) before it sets, whereafter the aluminum washer is machined to form an opening into which a knurled end of the shaft is pressed.

It will be recognized from the foregoing that several assembly steps are required incidental to coupling the shaft to the rotor by means of a hub in order to obtain concentricity in the critical dimension. Under the present invention, the steps are reduced in number at the same time a hub of less mass is attained, and it is unnecessary to extend the end of the shaft in order to achieve a thrust element.

In accordance with the present invention, FIGS. 4 and 5, a pre-molded rotor hub 35 of a relatively deformable plastic, having an integral thrust protuberance 36 on one side is bonded to one end of a rotor shaft 37. The hub 35 may be a body of relatively hard but nonetheless deformable plastic such as Delrin, polypropylene or the like, but softer than permanent magnet materials employed for magnetic rotors. The hub or disc 35 is molded with a plurality of equidistantly spaced teeth 38 presenting an outside diameter D which is slightly larger than the inside diameter D1 of a cylindrical permanent magnet rotor 40, FIG. 6, into which the hub is to be press fitted.

The assembly method is greatly simplified. First, the rotor 40 is positioned within a recess 44 in a fixture 42, FIG. 6, having an accurately centered bore 41, co-axial with the recess 44, for receiving the shaft 37 to which the hub 35 is fixed. The shaft 37 is presented to the bore 41 in the manner shown in FIG. 6. A force F is then applied of sufficient magnitude to press the hub into the opposed end of the rotor 40. Because of the fixturing, the shaft 37 will be concentric to the outside diameter of the rotor 40 (radius r, FIG. 6). This concentricity is maintained during press fitting of the hub 35 even though there may be some eccentricity between the inside diameter of the rotor and the toothed periphery of the hub 35. A slight eccentricity is shown in FIG. 6, but inasmuch as the teeth of the disc are shearable, being of material softer than the rotor, the hub teeth will differentially distort or bend, and will actually be shaved or trimmed, in the course of seating the hub by the press fit as the shaft is being progressively extended into the bore 41. The press fit automatically locks the shaft to the rotor.

As will be evident from FIG. 8, the spaces 38S between the teeth 38 reduce the mass of the hub, reducing inertia in the first instance. Vibration is reduced (if there is some eccentricity within a tolerance allowance) compared to the known structure where the periphery of the hub is continuous.

At the same time, the thrust protuberance 36 enables the shaft to be shortened in those instances where (see FIG. 2) the requirement is that provision be made for absorbing thrust. Further, thrust loading is applied to the hub and is not applied directly to the end of the shaft, that is, the forces are absorbed by the plastic hub meaning a more quiet motor.

I claim:

1. A method of assembling a cylindrical rotor and a metal rotor shaft into a rotor assembly for a subfractional dynamoelectric machine comprising the following steps:

A. presenting to one end of the rotor a circular hub molded substantially concentrically to one end of the shaft, said hub having a toothed periphery of deformable and shearable plastic material softer than the rotor, and the outer diameter of the hub being larger than the inner diameter of the rotor;

B. press-fitting the hub into the inner diameter of the rotor, while maintaining the outer diameters of the shaft and the rotor in concentric relation, the teeth of the hub distorting during press fitting to compensate for any eccentricity between the peripheral ends of the teeth and the inner diameter of the rotor.

* * * * *